(12) United States Patent
Weiner et al.

(10) Patent No.: US 8,875,230 B1
(45) Date of Patent: Oct. 28, 2014

(54) CONTROLLING ACCESS TO A SOFTWARE APPLICATION

(71) Applicant: Medidata Solutions, Inc., New York, NY (US)

(72) Inventors: Aaron Weiner, Brooklyn, NY (US); Matthew Szenher, Brooklyn, NY (US)

(73) Assignee: Medidata Solutions, Inc., New York, NY (US)

( * ) Notice: Subject to any disclaimer, the term of this patent is extended or adjusted under 35 U.S.C. 154(b) by 0 days.

(21) Appl. No.: 14/134,019

(22) Filed: Dec. 19, 2013

(51) Int. Cl.
*G06F 7/04* (2006.01)
*H04L 29/06* (2006.01)

(52) U.S. Cl.
CPC .................................. *H04L 63/20* (2013.01)
USPC .................................................. 726/1; 726/2

(58) Field of Classification Search
CPC ..... H04L 63/10; H04L 63/101; H04L 63/102; H04L 63/104; H04L 63/105
USPC .................................................. 726/1, 2, 27
See application file for complete search history.

(56) References Cited

U.S. PATENT DOCUMENTS

| | | | |
|---|---|---|---|
| 8,042,150 B2* | 10/2011 | Haswarey et al. | 726/1 |
| 8,381,306 B2* | 2/2013 | McPherson et al. | 726/27 |
| 8,458,337 B2* | 6/2013 | Corley et al. | 726/27 |
| 2002/0026592 A1* | 2/2002 | Gavrila et al. | 713/201 |
| 2005/0138419 A1* | 6/2005 | Gupta et al. | 713/201 |
| 2006/0117390 A1* | 6/2006 | Shrivastava et al. | 726/27 |
| 2009/0205018 A1* | 8/2009 | Ferraiolo et al. | 726/1 |
| 2009/0260056 A1* | 10/2009 | Garg et al. | 726/1 |
| 2011/0313782 A1* | 12/2011 | DeMeyer et al. | 705/2 |
| 2012/0159566 A1* | 6/2012 | Hrastnik et al. | 726/1 |
| 2013/0227638 A1* | 8/2013 | Giambiagi et al. | 726/1 |

OTHER PUBLICATIONS

Russello et al., "A Workflow-based Access Control Framework for e-Health Applications", 2008, 22nd International Conference on Advanced Information Networking and Applications (IEEE Computer Society), pp. 111-120.*
Rostad et al., "Access Control and Integration of Health Care Systems: An Experience Report and Future Challenges", 2007, Second International Conference on Availability, Reliability and Security (IEEE Computer Society), pp. 1-7.*
Hu et al., "Specification of Attribute Relations for Access Control Policies and Constraints Using Policy Machine", 2010, Sixth International Conference on Information Assurance and Security (IEEE), pp. 32-35.*
Ferraiolo et al., "Composing and Combining Policies under the Policy Machine", Jun. 1-3, 2005, SACMAT'05 (ACM), pp. 11-20.*
Lang et al., "An XACML Policy Generating Method Based on Policy View", 2008, IEEE, pp. 295-301.*
International Committee for Information Technology Standards, Next Generation Access Control—Functional Architecture (NGAC-FA), INCITS 499-201x, Mar. 19, 2012.

(Continued)

*Primary Examiner* — Matthew Smithers
(74) *Attorney, Agent, or Firm* — Steptoe & Johnson LLP; Robert Greenfeld

(57) ABSTRACT

A system for controlling access to a software application includes a policy machine template generator and a policy machine generator. The policy machine template generator may generate a policy machine template based on roles and permissions. The policy machine generator is coupled to the policy machine template generator and may generate a policy machine based on users and objects. The combination of the policy machine template and the policy machine is also claimed, as is a method for controlling access to a software application.

24 Claims, 10 Drawing Sheets

(56) References Cited

OTHER PUBLICATIONS

David Ferraiolo, Serban Gavrila, and Wayne Jansen, Policy Machine: Features, Architecture, and Specification (National Institute of Standards and Technology), Dec. 2012.

National Institute of Standards and Technology, Computer Security Resource Center, List of References for Policy Machines (http://csrc.nist.gov/pm/references-library.html, downloaded Apr. 7, 2014).

National Institute of Standards and Technology, Computer Security Resource Center, Policy Machine (http://csrc.nist.gov/pm/, downloaded Sep. 16, 2013).

* cited by examiner

CONTROLLING ACCESS TO A SOFTWARE APPLICATION

BACKGROUND

Software applications may be provided to users via a network. A networked application may be accessed by a user via a website over the Internet or other distributed network. Because the network over which communication with a networked application may occur may be public, proper access control is often needed, requiring a user in some cases to enter a username and password or other form of authentication and/or authorization.

Distributed computing often involves a collection of RESTful web services. (REST is an architectural standard for distributed systems. In REST, interactions between components are conceptualized as a series of stateless requests from a client to a server, each of which concerns a specific resource.) Each service may make a variety of authentication (who am I?) and authorization (what am I allowed to do?) determinations. Despite their various and distributed nature, these determinations should be made in a consistent manner across the entire distributed platform. If individual services implement access control independently, an oversight may occur, and one or more communication routes that are exposed may be insufficiently protected. One way of mitigating this problem is to use OWASP ASVS Access Control Requirements (see code.google.com/p/owasp-asys/wiki/Verification_V4), which suggest using a centralized mechanism (including libraries that call external authorization services) to protect access to each type of protected resource.

BRIEF DESCRIPTION OF THE DRAWINGS

FIG. 10 is a graphical diagram of a combination policy machine template and policy machine, according to an embodiment of the present invention; and.

Figure 1:
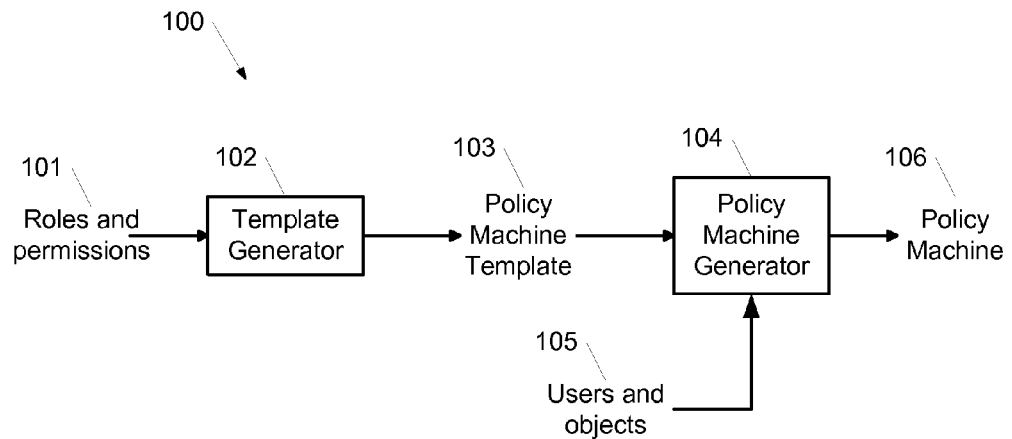
FIG. 1 is a block diagram of a system for generating a policy machine, according to an embodiment of the present invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

One approach to controlling access in a distributed network may include using several services as part of a role-based access control system, which may comprise mapping of roles to permissions. A "policy machine" may be used to authorize a request in such a system.

A policy machine is an access control framework that rigorously describes the set of authorized capabilities on a platform. In a policy machine, a "privilege" or capability may be defined by a triad consisting of <user, operation, object>. There is a finite list of operations such as "read," "write," or "delete"; an object is a protected item such as a medical record. For example, Bob Smith is authorized to delete medical_record_564 if and only if the capability <Bob Smith, delete, medical_record_564> can be derived from the policy machine. Operations may be organized into operation sets, overlapping collections of operations organized according to authorization rules.

This access control architecture has been described in a U.S. National Institute of Standards and Technology ("NIST") Interagency Report (IR) called, "Policy Machine: Features, Architecture, and Specification," authored by David Ferraiolo, Serban Gavrila, and Wayne Jansen in December 2012. It is also being incorporated into a specification for using a policy machine approach developed by the NIST and other members of an ad hoc International Committee for Information Technology Standards (INCITS), proposed to be adopted by the American National Standards Institute.

The NIST Policy Machine specification does not specify how to generate a policy machine, nor is it sufficient for use in a highly configurable implementation. The formalism in the NIST specification is intended to be applied to a broad variety of systems, and the specification provides only brief summaries of "administrative commands," which are pieces of business logic surrounding administrative operations. The specification does not express any particular constraints on this logic, and the logic is not represented within the policy state.

In contrast to the NIST specification, the present invention generates a policy machine, for use in a highly configurable implementation, that expresses how different users may need different policies. It represents these policies using a type of formalism introduced by the NIST specification, which allows for easier code reuse and policy interoperability.

Reference is now made to FIG. 1, which is a system 100 for generating a policy machine. System 100 includes template generator 102 that takes as inputs roles and permissions 101 and produces policy machine template 103. Policy machine template 103 is input to policy machine generator 104 along with users and objects 105 to generate policy machine 106.

Roles and permissions 101 may be expressed as in Table 1:

TABLE 1

| Role | Permission | | |
|---|---|---|---|
| | Read Study | Read Site | Read Depot |
| Study Site Manager | Yes | Yes | No |
| Study Depot Manager | Yes | No | Yes |

This policy describes which of three possible permissions is granted by each of two possible roles. Both a Study Site Manager and a Study Depot Manager can read information about a study, but only a Study Site Manager can read information about the sites involved in that study.

Figure 2:
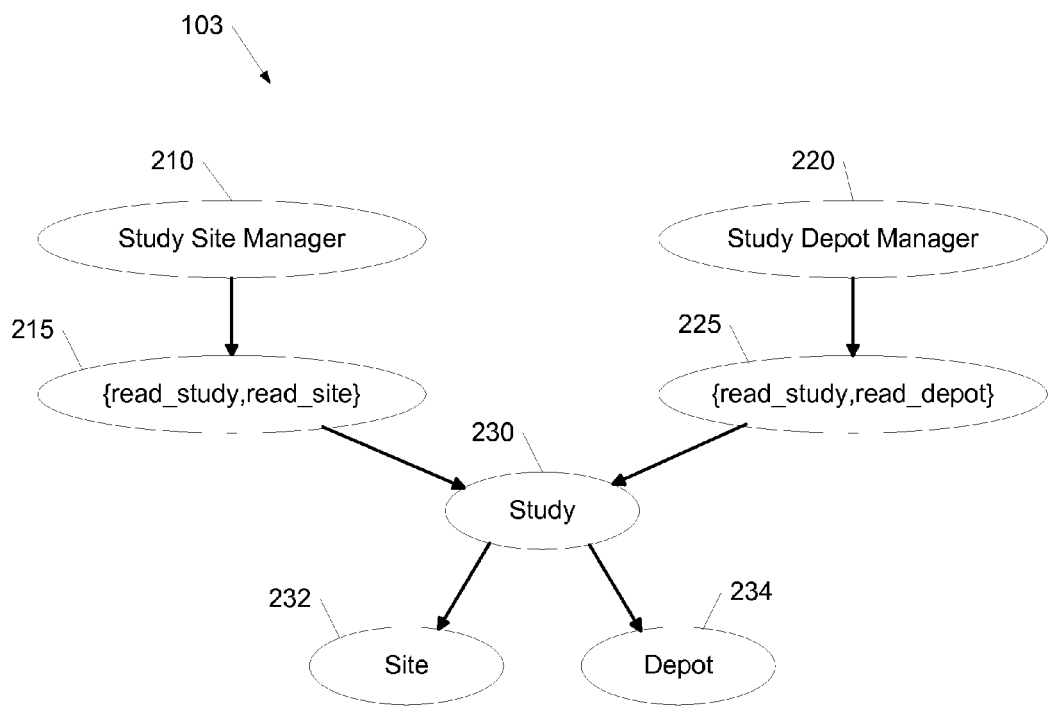
FIG. 2 is a graphical diagram of a policy machine template, according to an embodiment of the present invention.

FIG. 2 is a translation of Table 1 into a graphical version of policy machine template 103, which shows more clearly the study's relationships with other objects. Study Site Manager 210 has the permissions to read study and read site as shown in 215, while Study Depot Manager 220 has the permissions to read study and read depot as shown in 225. Study 230 mediates the Study Site Manager's permission on site 232 and the Study Depot Manager's permission on depot 234.

The entity represented in Table 1 is a tabular example of policy machine template 103, but it is not a policy machine because it cannot in itself answer the question "Can Bob Smith delete medical_record_564 in (site) Bethlehem Medical in Study QRX?" It does not contain information about any of those three real-world entities, user, operation, and object. However, a policy machine template can be queried like a policy machine to retrieve policy configuration information. "Study Site Manager" can be treated as a user, and "Study," "Site," and "Depot" can be treated as objects. According to the formalism, the question can be asked, "Can a Study Site Manager read information on a Site in a Study?" and the reply may be "yes," while the question, "Can a Study Depot Manager read information on a Site in a Study?" can be answered "no."

Policy machine template 103 can then be used to build an actual policy machine. The policy machine starts out empty because there is no real-world data. Then, the process governing the policy machine may receive information about users and objects 105 that a user, "Bob Smith," has been granted the Study Site Manager role for a study named "Study QRX." Policy machine template 103 is then used as a reference to add this information to the policy machine. Because Study Site Manager 210 can perform the operations in operation set 215 ({read_study, read_site}) on studies, that operation set can be copied into the policy machine, as shown in FIG. 3A.

Figure 3A:
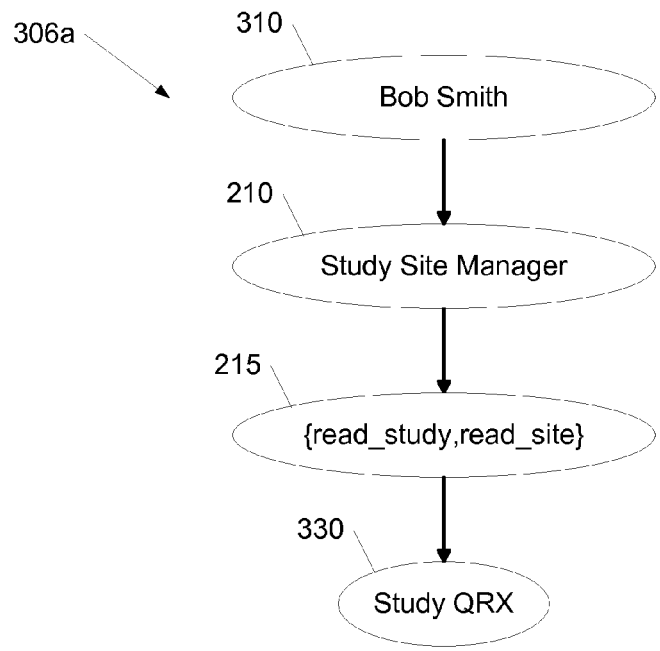
FIGS. 3A and 3B are graphical diagrams of partial policy machines illustrating users being assigned to roles and objects, according to embodiments of the present invention.

FIG. 3A shows policy machine 306*a* after one role assignment—that of assigning Bob Smith 310 to Study Site Manager 210. Study Site Manager 210 could be considered a user in policy machine template 103 in FIG. 2, but becomes a "user attribute" or "role" in FIG. 3A in policy machine terms. FIG. 3A shows the combination of the real-world data with the policy machine template to create a policy machine. Bob Smith has the Study Site Manager role on Study QRX 330 because of an external process, and the Study Site Manager role has the pictured operation set 215 because that is what that role has in the template.

Next, the process governing the policy machine may receive information about users and objects 105 that a site, "Bethlehem Medical," has been added to Study QRX. The policy machine template shows that this relationship has relevance to the policy, so that relationship can now be incorporated into the policy machine.

Figure 3B:
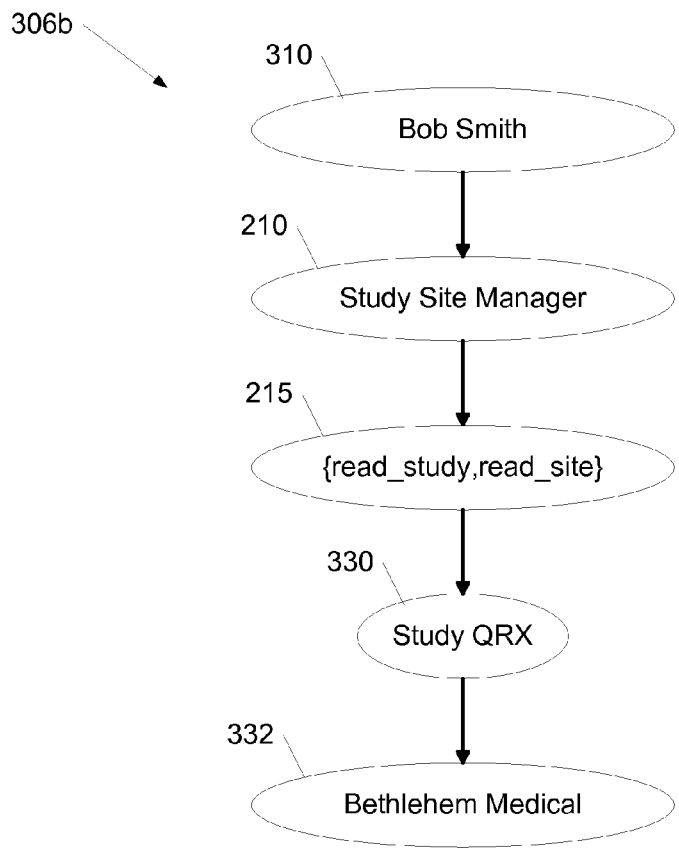

FIG. 3B shows policy machine 306*b* after the site has been added. The policy machine now conveys that Bob Smith can read information for Bethlehem Medical 332. Even though the graphs in FIGS. 3A and 3B reference policy machine template 103, the template has not changed from its initial depiction in FIG. 2. The template does not change in response to real-world information; it just conveys how to interpret the real-world information.

As more users, studies, sites, and depots are added, this process is repeated and the policy machine may grow into a large graph. If a user or role assignment is removed, the node may simply be deleted from the graph—there is no need to reference the policy machine template in that case.

Figure 4A:
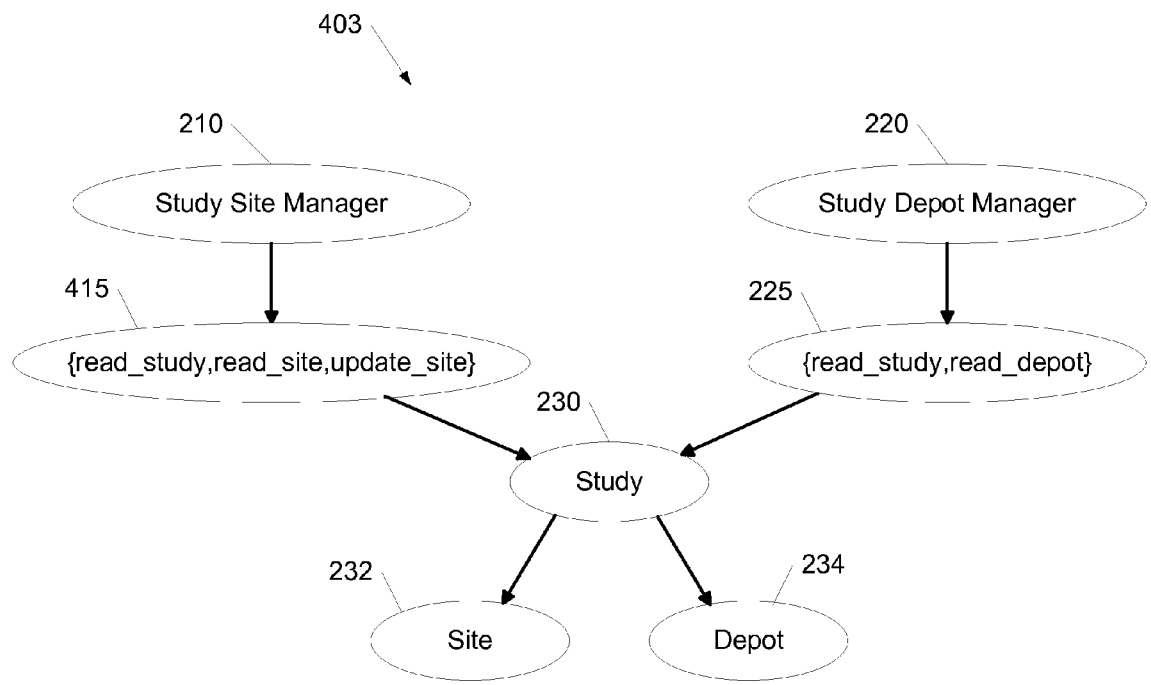
FIG. 4A is a graphical diagram of an updated policy machine template, according to an embodiment of the present invention.

For ease of understanding, the policy machine will remain the same for now, and consider the case where, due to a change in policy, the policy machine template is changed, such that a Study Site Manager also has an update_site privilege. The relevant operation set 215 in the template 103 in FIG. 2 is altered as shown in FIG. 4A.

Figure 4B:
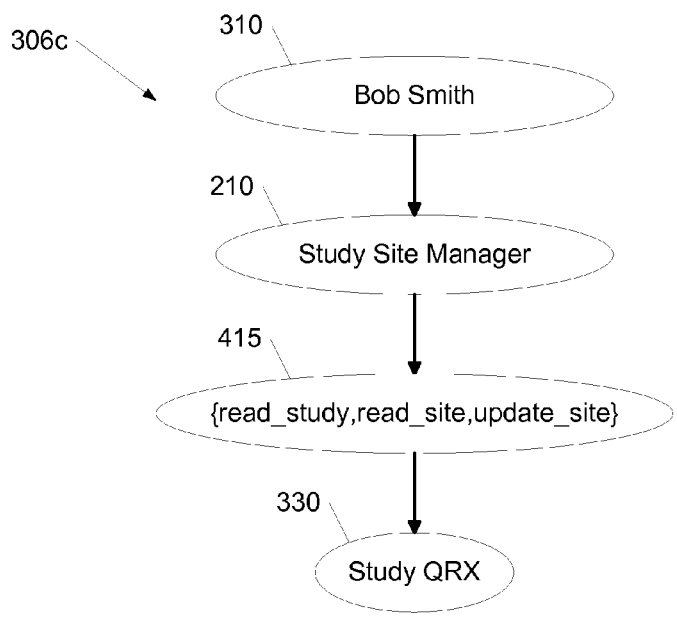
FIG. 4B is a graphical diagram of an updated policy machine, according to an embodiment of the present invention.

This change in policy machine template 403 triggers a change in policy machine 306*c* itself. All operation sets that are derived from altered operation set 415 are then automatically altered to match, as shown in FIG. 4B.

Figure 5:
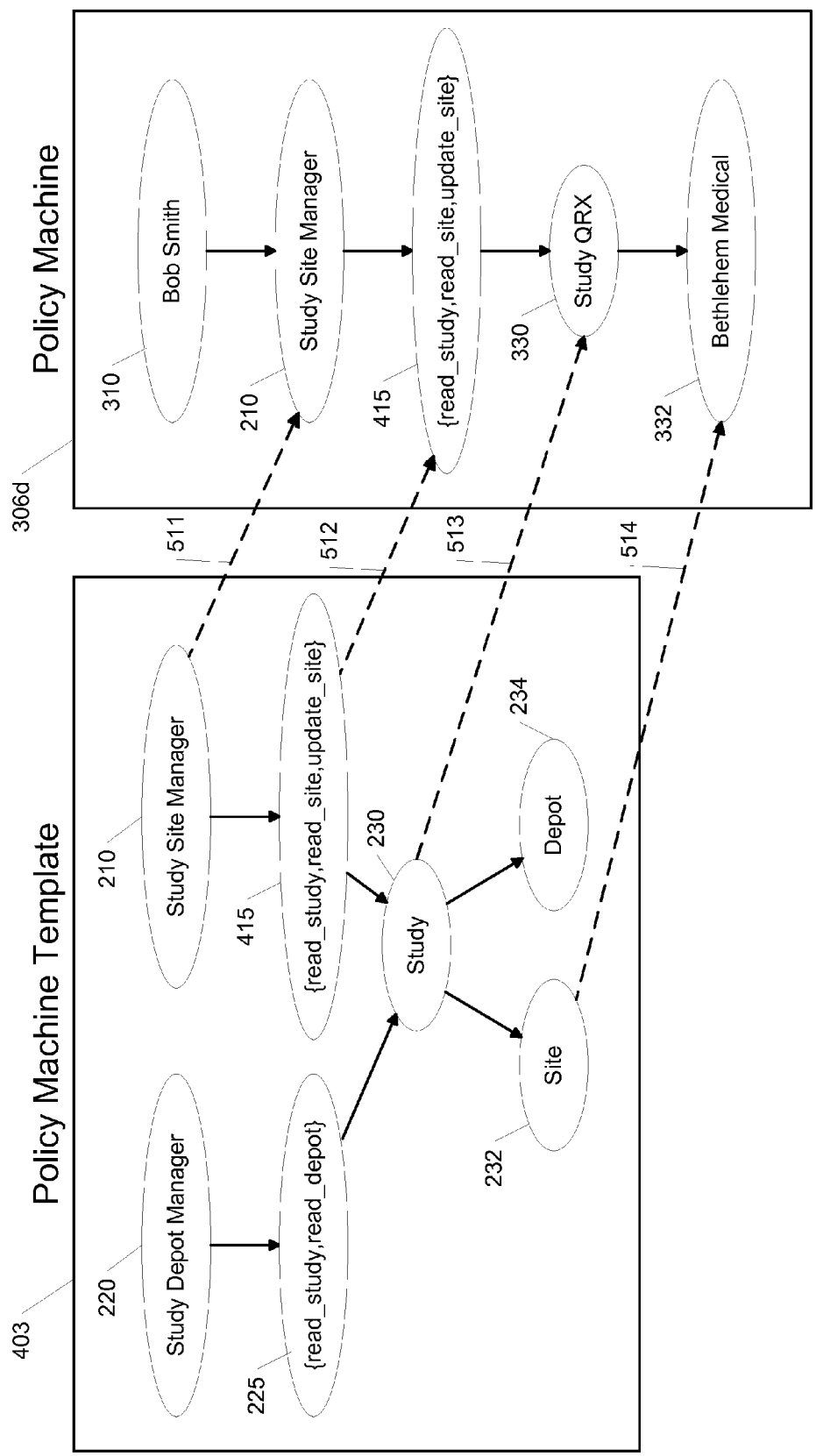
FIG. 5 is a diagram of a combination policy machine template and policy machine, according to an embodiment of the present invention.

To make this update happen, the logical links between the corresponding elements in policy machine template 403 and the policy machine should be maintained. These could be represented via dashed/dotted lines 511-514 on a graph as shown in FIG. 5, although they are not connections in the sense of the policy machine formalism. That is, they are not assignments, or anything else with meaning within the policy machine.

To make the graph in FIG. 5 as simple as possible, only one user is included. If more elements are added to policy machine 306*d* on the right side of FIG. 5, more dotted lines would need to come from the policy machine template on the left side. For example, if multiple users existed with the Study Site Manager role, each would have a separate role node, each of which would be connected by a dotted line to Study Site Manager 210 in policy machine template 403.

Figure 6:
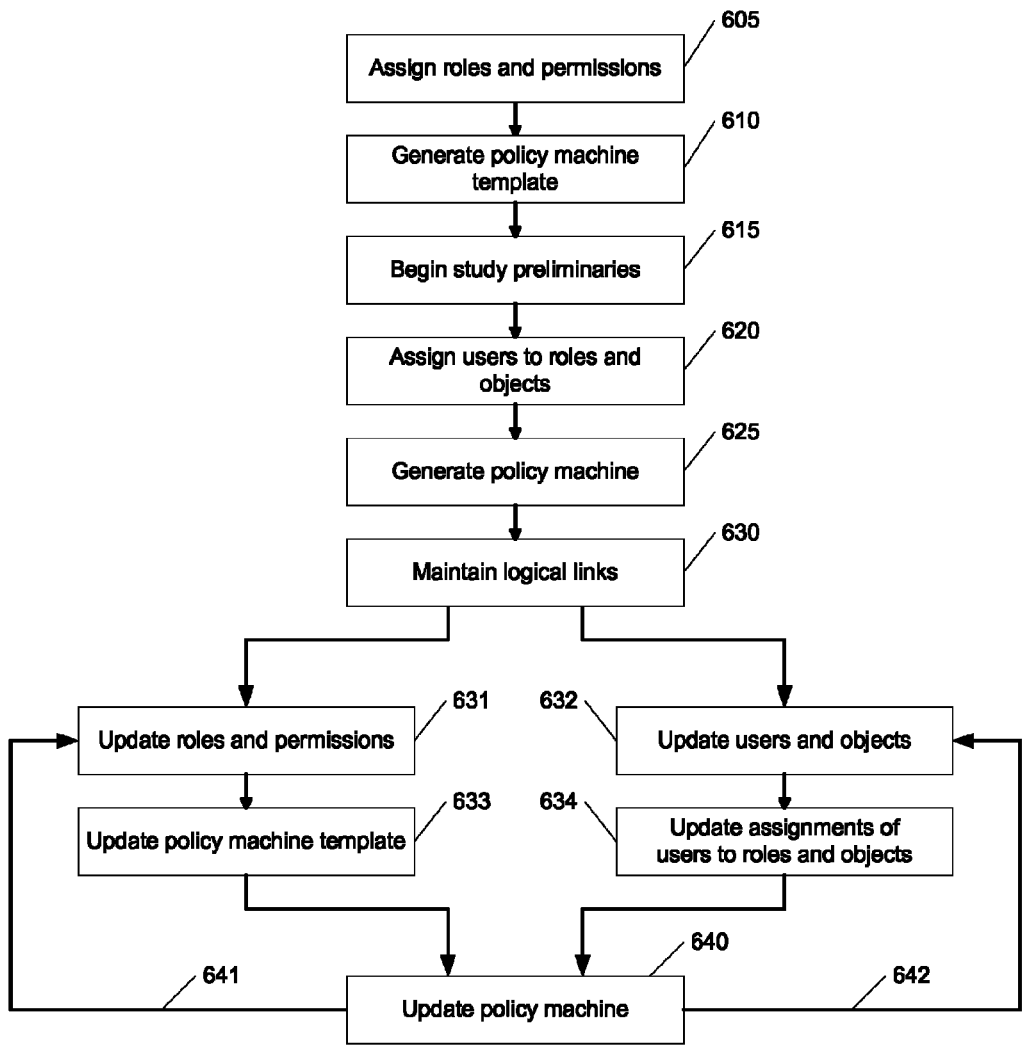
FIG. 6 is a flowchart illustrating how a policy machine may be generated, according to an embodiment of the present invention.

FIG. 6 is a flowchart that illustrates how a policy machine may be generated, according to an embodiment of the present invention. In operation 605, roles and permissions may be assigned. In the clinical data sphere, the roles may be clinical trial roles such as principal investigator, clinical research associate (CRA), clinical research coordinator (CRC), study coordinator, site monitor, data manager, CRO manager; clinical quality manager, EDC study builder, programmer, biostatistician, patient informed consent specialist, patient recruitment specialist, R&D senior manager, vendor, pharmacovigilance specialist, etc. The assignments may be made by a company that offers the clinical trial software, so that there are default roles and permissions, or made by a sponsor or CRO, one role at a time, or a combination of the two. Embodiments of the invention may be used in applications other than clinical data—essentially any situation in which there are clearly-defined roles. One example is in information technology (IT), in which a system administrator has a high degree of permission to make changes to a computer system, but regular workers may have almost no permission vis-à-vis their computer or network. Another example is an employee directory in which the human resources manager, line manager, team lead, coworker, and employee each have different permission sets. A third example is a social networking site in which a user assigns its various contacts with different permission levels in order to control privacy. The assignments in each of these examples may be laid out in a table like Table 1.

In operation 610, a policy machine template may be generated, such as policy machine template 103, shown in FIG. 2. In operation 615, the preliminary actions for a clinical trial may begin, such as signing up sites and principal investigators, enrolling patients, purchasing access to and integrating with software, defining a randomization and blinding scheme, and others. In operation 620, users may be assigned to roles and objects, such as Study Site Manager and Study QRX ("objects" can be sites, studies, depots, etc.), and, as illustrated in FIGS. 3A and 3B, one or more policy machines may be generated as in operation 625.

It is envisioned that there will be updates to the roles and permissions as well as to the users and objects, such that the policy machine may not remain the same for the duration of a project, such as a clinical trial. In that case, logical links should be maintained in operation 630 between corresponding elements in the policy machine template and the policy machine, as illustrated in FIG. 5. If roles and/or permissions are updated in operation 631, such as illustrated in FIG. 4A, then policy machine template should be updated as in operation 633, as illustrated in FIG. 4B, and the policy machine should be updated as in operation 640, as illustrated in FIG. 5. Similarly, users and objects may be updated in operation 632, then assignments of users to roles and objects may be performed in operation 634, and the policy machine should be updated as in operation 640. Such updates may occur recursively, as shown by arrows 641 and 642.

Besides the operations shown in FIG. 6, other operations or series of operations may be used to generate policy machine templates and policy machines. Moreover, the actual order of the operations in the flowchart may not be critical.

Figure 7A:
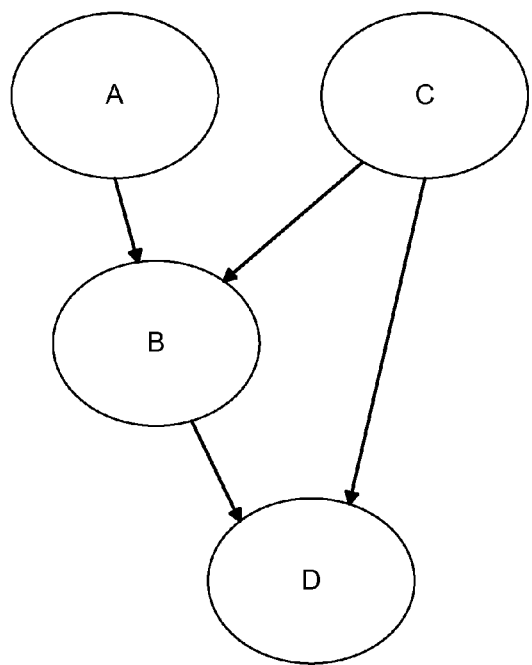
FIGS. 7A and 7B are diagrams of a directed acyclic graph and a cyclic graph, respectively.
Figure 7B:
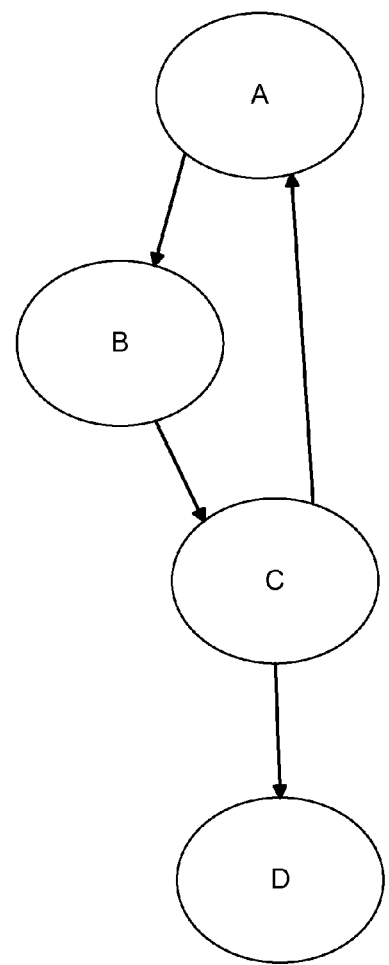

The graphs in FIGS. 2-5, i.e., the policy machine templates and policy machines, may be represented using a directed acyclic graph. A directed graph is a set of nodes and edges, with each edge corresponding to an ordered pair of nodes. As shown in FIG. 7A, two nodes A and B are considered "connected" if there exists a sequence of at least two nodes, starting with A and ending with B, such that each consecutive pair corresponds to an edge. This sequence is called a "path." A directed graph is acyclic when there is no node that is connected to itself. In FIG. 7A, nodes A and C are connected to node B directly, and to node D through a path that includes B. Node C is also connected directly to node D, so that if node B were removed, node C would remain connected. This is a directed acyclic graph. The graph in FIG. 7B contains a cycle from node A to node B to node C to node A, and thus is not acyclic.

Figure 8:
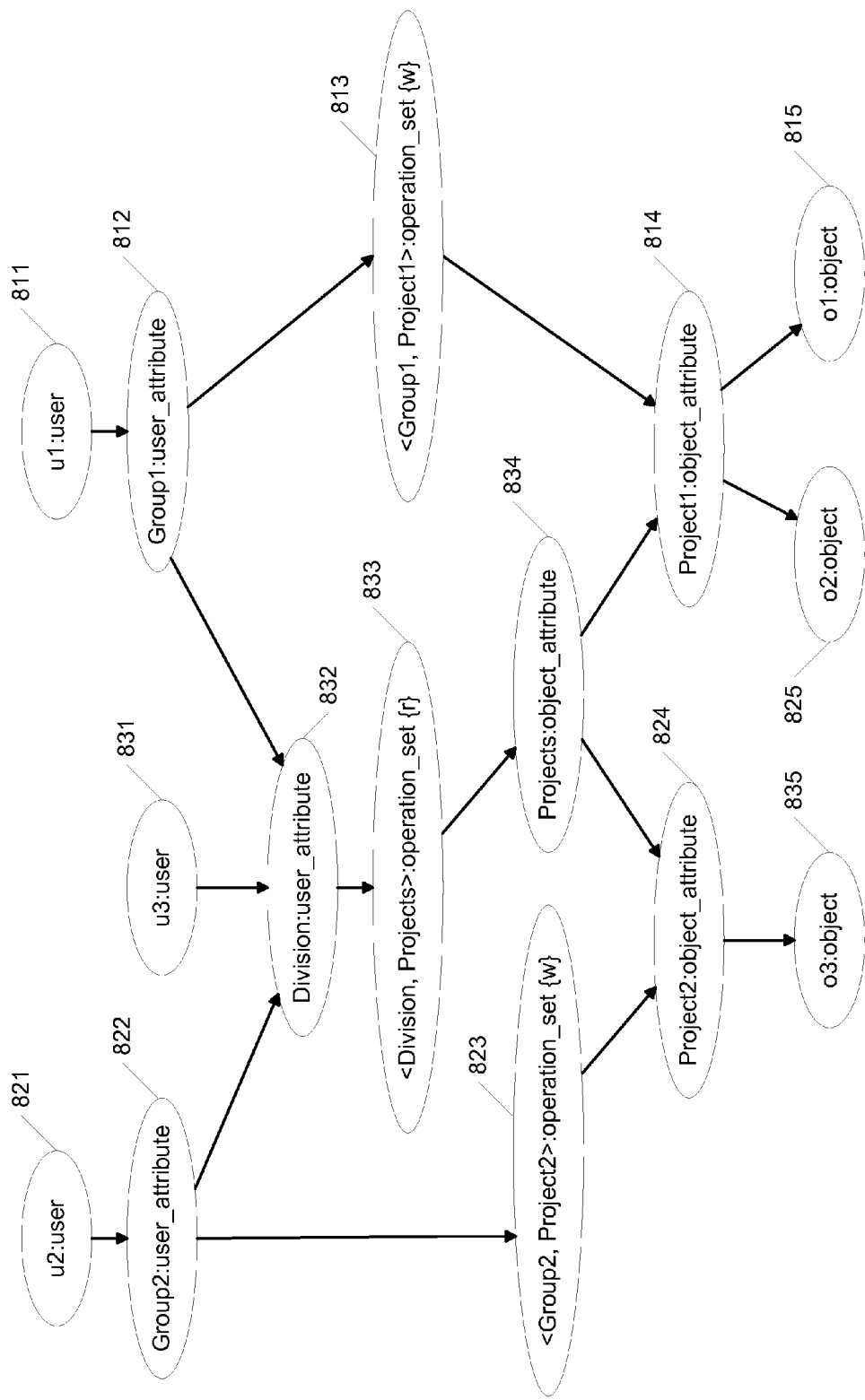
FIG. 8 is a graphical diagram of an access state for a policy machine, as may be used in an embodiment of the present invention.

In the policy machine formalism, users, objects, and operation sets may be nodes on a directed acyclic graph, as are two types of mediating nodes: user attributes, which correspond conceptually to roles, and object attributes, which can reflect any property of an object that is relevant to authorization, such as a unique identifier, a classification, or an association with another object. In a basic version of a policy machine, a capability <user, operation, object> can be derived if and only if an operation set ops exists such that:

1. operation is an element of ops
2. user is connected to ops
3. ops is connected to object The graph in FIG. 8 represents one possible access state for a policy machine. In this access state, user "u1," represented by node 811, is connected to the <Division, Projects> operation set (node 833), which contains the "r" ("read") operation. This same operation set is connected to all three objects o1, o2, and o3, represented by nodes 815, 825, 835. User u1 thus has the capability to read each of those three objects. The path from u1 to the <Division, Project> operation set may be read as "u1 is part of Group 1, which is part of the Division, which is allowed to read each object belonging to any project." The path from the operation set (node 833) to object o3 (node 835) may be read (working backwards) as "o3 is part of Project 2 (node 824), which is a Project, so o3 is subject to the <Division, Project> operation set." The "w" ("write") operation on an object is limited to users who are part of the Group that owns the Project that owns the object. User u2 (node 821) is connected to <Group2, Project2> (node 823), but not <Group1, Project1> (node 813), which authorizes u2 to write to o3, but not to either of the other objects. User u1's write permissions are the inverse of u2's. User u3 (node 831) is not connected to any operation set containing "w," and thus has no write capability on any object.

The policy machine state may be adjusted using "administrative operations." Access control for administrative operations may be represented using the same formalism as for other operations. This allows the policy machine to govern its own authorization.

The present invention goes beyond the NIST specification to represent an abstract business rule (also called an abstract privilege, a role permission, or a configuration) of the form, "If a user has the role <role> on a resource of type <resource type>, that user can perform the operation <operation> on that resource's<resource association>." For example, a client may wish to configure a study such that a user with the role "site inventory manager" for one of that study's study-sites can reorder any inventory item for that study-site. Such configuration option can be represented in an intuitive, accessible way, and may be honored within the policy machine whenever such a role assignment is made, or whenever an inventory item becomes associated with a study-site.

The directed acyclic graph concept may not be sufficient in this situation. In a policy graph, the way to represent that a role assignment is subject to a particular rule is by connecting an element in it to a global object attribute shared by all such assignments. But this creates too much connectivity in the graph—it does not allow a distinction to be made between similar role assignments between different users to different objects.

An embodiment of the present invention resolves this issue. In this implementation, a configuration may be represented using a policy machine template that is not a part of the NIST policy machine. Borrowing terminology from object-oriented programming, the nodes in the policy machine may be instances of the nodes in the policy machine template.

Figure 9:
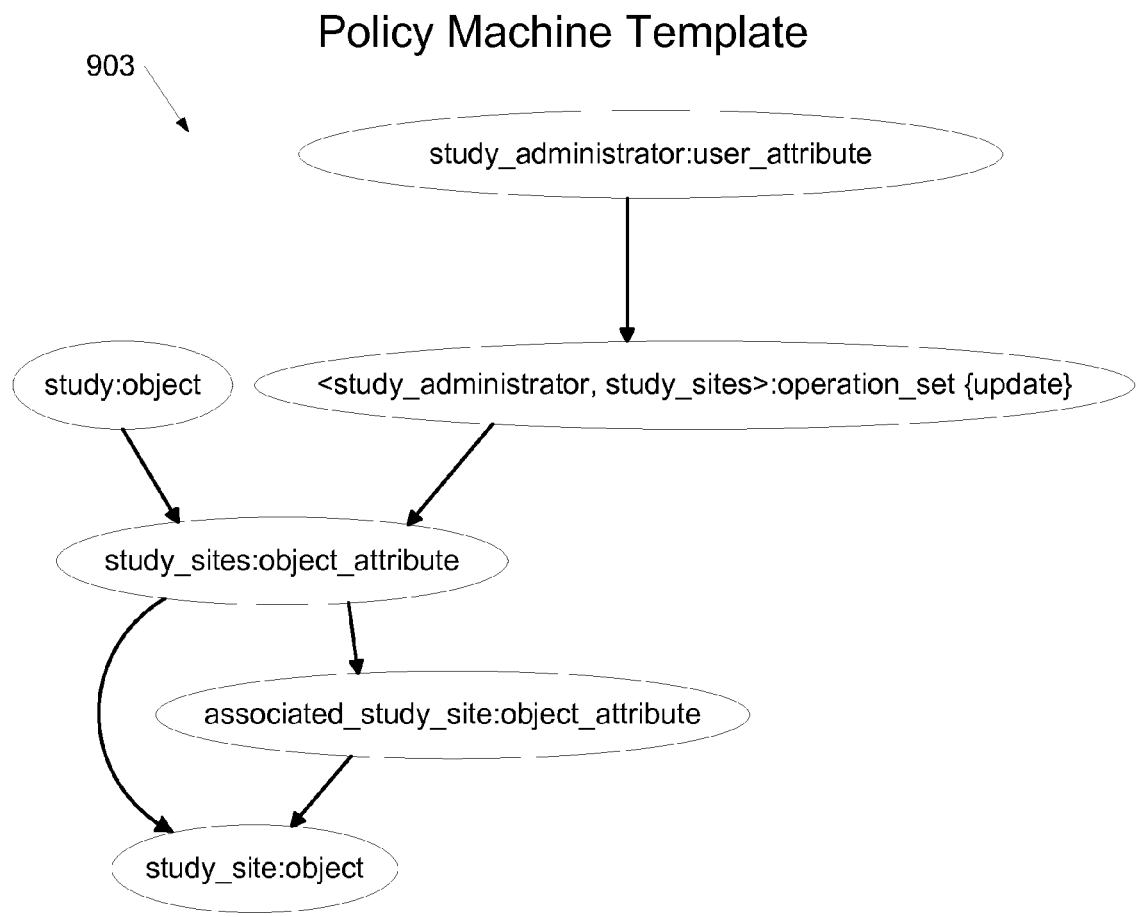
FIG. 9 is a graphical diagram of part of a policy machine template, according to an embodiment of the present invention.

FIG. 9 is a diagram of part of a policy machine template 903, according to an embodiment of the present invention. It represents the configuration, "A study administrator for a study may update the study-sites for that study." The full graph would represent all of the authorization rules for a given configuration type. A configuration type is a collection of configurations (abstract privileges or role permissions). If two studies have the same access control policies (roles with the same name have the same permission set in both), it is said that they "share a configuration type" or that "study B cloned study A's configuration type." The nodes in FIG. 9 are analogous to "classes"—the result of the study object being connected to a "study-sites" object attribute is that "a study can have study-sites."

When a user is assigned a study administrator role, instances of these nodes may be added to the policy machine. Their connections may be inferred programmatically from the connections in the policy machine template. Every node added to the policy machine is given a tag that matches it to a node in the template. If two nodes are connected in the template, the nodes with corresponding tags are connected in the policy machine. The coupling between a class and its instance may be persisted within the system, so that if the configuration changes, the policy machine state changes to match the configuration.

Figure 10:
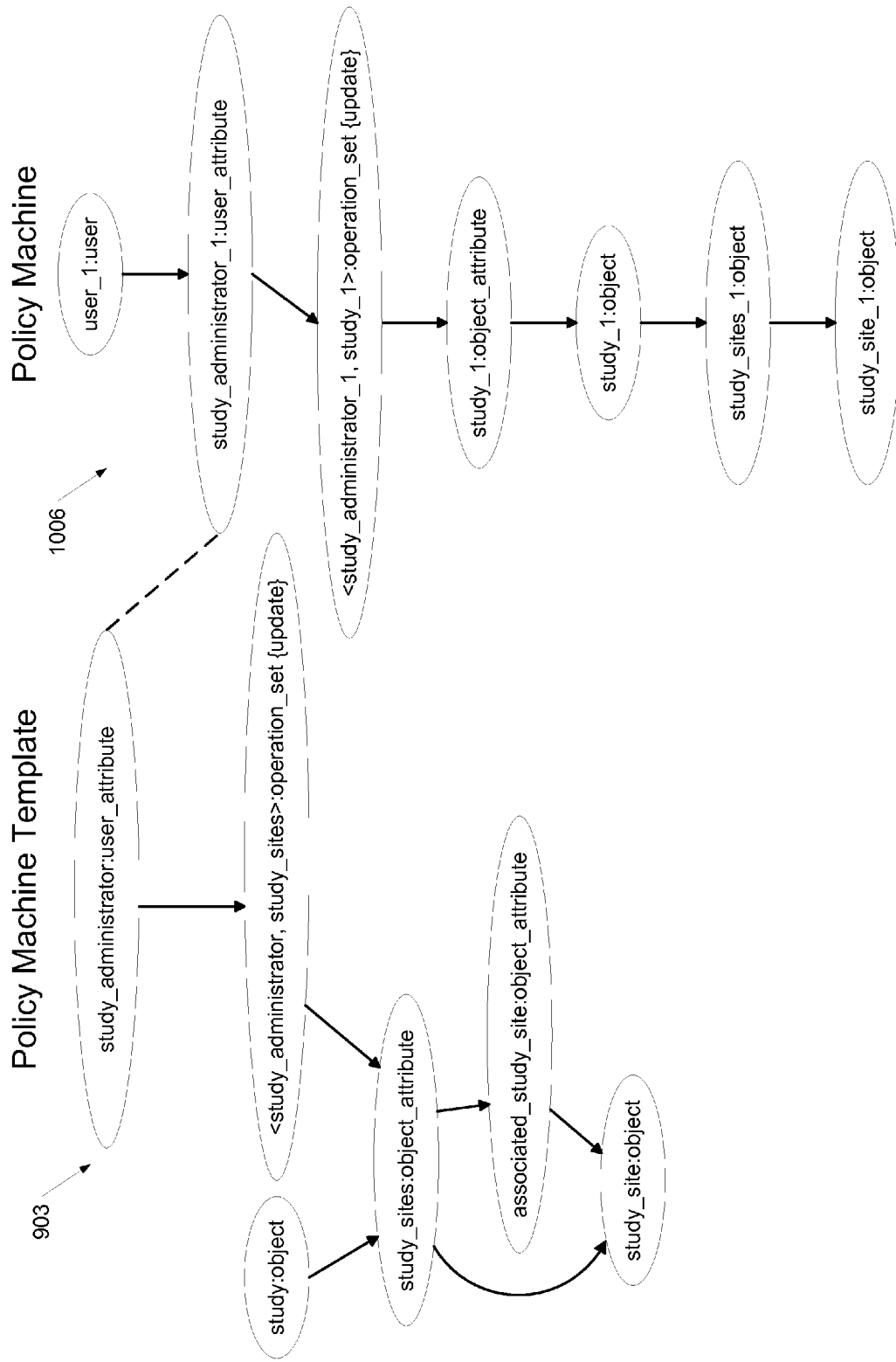

This is shown in FIG. 10, which illustrates a policy state honoring a sample configuration of policy machine template 903 and its relation to policy machine 1006, according to an embodiment of the invention. This shows how a template may be used to generate a policy machine, providing functionality that goes beyond that which can be represented with a single directed acyclic graph.

For both the policy machine template and the policy machine itself, several persistence (non-volatile storage) options are available. A graph database may be used, because of the policy machine formalism, using a NoSQL database for scalability. A directed acyclic graph can also be represented in a traditional relational database. These choices may be made independently for the template and the machine, but it will likely be more expedient to re-use the same infrastructure for each.

Various bulk query requirements may be conceptualized as representing "subtrees" of the runtime policy graph, created by picking a single node as the root and traversing all paths, stopping on nodes of a specified type, which are treated as leaves. This can be explained with reference to FIG. 8, which contains only the policy machine. In FIG. 8, the question, "What objects does User 1 have access to?" can be answered by starting at the "u1" node 811 and following all of the outgoing arrows, collecting every node with the ":object" label. Erasing every node that is not accessible by following outgoing arrows this way, results in a "subgraph" or "subtree" containing only the items of interest. There has been extensive work on making such operations performant, i.e., there are many published algorithms and open-source software for finding these subgraphs quickly.

Figure 11:
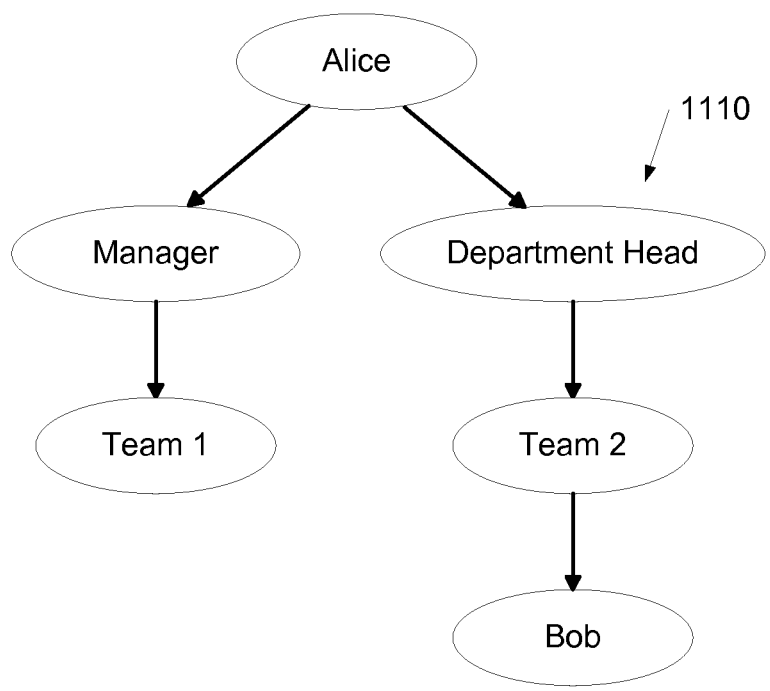
FIG. 11 is a graphical diagram of part of a policy machine to illustrate subtrees, according to an embodiment of the present invention.

The policy machine formalism is beneficial because users have the option to specify a single role on which to base access control decisions. Since each instance of a role assignment may be represented in the policy machine as its own node, the same capability determination may be made on it that would be made for a user node, in effect "chopping off" the root node of the user-permissions subtree and descending one level. An example of this is shown in FIG. 11, which illustrates a simple case of subtrees being extracted from an authorization graph. In this figure, a user Alice, via her "Manager" and "Development Head" roles, has access to three hierarchically arranged objects, Team 1, Team 2, and Bob. To answer the question, "Which objects does Alice have access to in her Development Head role?," we look at the subtree descending from the node representing that role (subtree 1110). Because "Team 1" is not accessible via the Department Head node, it is not part of subtree 1110 and should not be visible to Alice when she is acting in her capacity as Department Head. Team 2 and its member Bob are accessible, and thus are part of subtree 1110. This illustrates that the policy machine formalism is sufficient to address a requirement that users with multiple roles be able to restrict their views to those granted by one role.

As part of the user experience for creating and managing configuration types, the policy machine template may be configured through a user interface that may involve visualizations such as those in FIG. 10. This interface may be aware of what operations are supported for each resource, the possible relations between each resource, and a default set of recommended operation sets for each of the roles. This configuration may be viewed or edited at any time, and may be "cloned" for new studies. Users may then be granted role assignments to objects via a user interface or service. The details of how these assignments "cascade" to child objects do not necessarily need to be exposed during this process. Generally, only one role assignment will be necessary at a time.

The present invention fulfills the access control requirements for each element of a distributed network, including client libraries that are compatible with all distributed network services. Embodiments of the present invention are role-based, because customers may define their authorization requirements by assigning roles to their users and permissions to those roles. Embodiments may incorporate both human and automated users by allowing some applications to take a restricted set of actions independently of users, and others to act on behalf of humans.

The present invention has other attributes. It may allow users to be assigned different roles for different instances of the same resource type. A typical case is that a user is a principal investigator for one or more studies, but has no roles for other studies. In many cases, a user may also have a different role for another study. Embodiments of the invention maintain separate access control lists for different objects, which is known as horizontal access control. Embodiments of the invention may allow a single role assignment to be inherited by associated resources, such that a study-site can authorize based on a rule such as "a clinical study manager for a study-site's study can see attributes for that study-site." Embodiments may support arbitrary levels of nesting for these associations with a scalable and extensible implementation.

The present invention may be configurable on a resource-to-resource basis, by being able to provide a default configuration type that can be modified for different client divisions or different studies. A client may be able to configure access control through a web-based user interface without needing detailed information about the working of the underlying software application. Changes to the configuration of a live resource may take automatic effect on that resource, as was shown in FIG. 6.

The present invention may allow a user with multiple roles to limit the user's authorizations to those granted by one role. For example, a user with both the Principal Investigator and Clinical Research Associate roles may be able to choose to "act as" a Clinical Research Associate only, hiding actions that are granted to the user only via the Principal Investigator role.

The present invention may allow bulk queries. Thus, it may be possible to efficiently generate a list of resources to which a given operator (user, role, or app) has access, a list of operators who have access to a resource, and a list of permitted operations for a given operator/resource pair. The present invention may also be multi-tenant compatible in that no application is needed to grant unconditional trust to anything other than the central access control service.

Although embodiments of the present invention have been described in terms of networked software applications, other embodiments of the present invention may involve standalone, single use, and/or single tenant software packages that may be presented to a user on a CD, a DVD, or a floppy disk, or via download to a standalone computer. In addition, users may be able to sign on to a kiosk that many users with various roles and permissions can access, and the access control policies of this invention may be used in this situation.

Aspects of the present invention may be embodied in the form of a system, a computer program product, or a method. Similarly, aspects of the present invention may be embodied as hardware, software or a combination of both. Aspects of the present invention may be embodied as a computer program product saved on one or more computer-readable media in the form of computer-readable program code embodied thereon.

For example, the computer-readable medium may be a computer-readable signal medium or a computer-readable storage medium. A computer-readable storage medium may be, for example, an electronic, optical, magnetic, electromagnetic, infrared, or semiconductor system, apparatus, or device, or any combination thereof.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Computer program code in embodiments of the present invention may be written in any suitable programming language. The program code may execute on a single computer, or on a plurality of computers. The computer may include a processing unit in communication with a computer-usable medium, wherein the computer-usable medium contains a set of instructions, and wherein the processing unit is designed to carry out the set of instructions.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A system for controlling access to a software application, the system comprising:
   a policy machine template generator for generating a policy machine template based on roles and permissions for operators; and
   a policy machine generator, coupled to the policy machine template generator, for generating a policy machine based on operators and objects,
   wherein the policy machine:
      is an access control framework permitting directed acyclic graph relationships between objects; and
      operates to control access to the software application.

2. The system of claim 1, wherein the software application runs on a distributed network.

3. The system of claim 1, wherein the roles comprise a clinical trial role.

4. The system of claim 1, wherein the roles comprise an information technology system role.

5. The system of claim 1, wherein the objects comprise a clinical study.

6. The system of claim 1, wherein the objects comprise a clinical study site.

7. The system of claim 1, wherein access to a plurality of software applications is controlled.

8. The system of claim 1, wherein the policy machine is configured to produce capabilities for the operators of the software application.

9. The system of claim 8, wherein the capabilities comprise the users being able to perform operations on the objects.

10. The system of claim 1, wherein the operators are users.

11. The system of claim 1, wherein the operators are roles.

12. The system of claim 1, wherein the operators are applications.

13. A method for controlling access to a software application, comprising:
   assigning at least one role and at least one permission to said role;
   generating a policy machine template based on the role and the permission;
   assigning at least one user to the role;
   generating a policy machine based on the user and objects associated with the user, wherein the policy machine is an access control framework permitting directed acyclic graph relationships between objects; and
   maintaining at least one logical link between the policy machine template and the policy machine,
   wherein the policy machine operates to control access to the software application.

14. The method of claim 13, further comprising updating the policy machine template.

15. The method of claim 14, further comprising updating the at least one role and at least one permission.

16. The method of claim 13, further comprising updating the policy machine.

17. The method of claim 16, further comprising updating the user and objects associated with the user.

18. An apparatus for controlling access to a software application, comprising:
   a policy machine template based on roles and permissions for operators; and
   a policy machine, coupled to the policy machine template and based on users operators and objects, wherein the policy machine is an access control framework permitting directed acyclic graph relationships between objects and the policy machine operates to control access to the software application.

19. The apparatus of claim 18, wherein the software application runs on a distributed network.

20. The apparatus of claim 18, wherein the roles comprise a clinical trial role.

21. The apparatus of claim 18, wherein the roles comprise an information technology system role.

22. The apparatus of claim 18, wherein the objects comprise a clinical study.

23. The apparatus of claim 18, wherein the objects comprise a clinical study site.

24. The apparatus of claim 18, wherein the policy machine is an acyclic graph.

* * * * *